United States Patent
Nielsen et al.

(10) Patent No.: US 11,333,128 B2
(45) Date of Patent: May 17, 2022

(54) METHOD FOR CONTROLLING A TIP HEIGHT OF A WIND TURBINE

(71) Applicant: Vestas Wind Systems A/S, Aarhus N. (DK)

(72) Inventors: Thomas S. Bjertrup Nielsen, Randers Sv (DK); Peter Bjørn Andersen, Skanderborg (DK); Torben Ladegaard Baun, Skødstrup (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/260,020

(22) PCT Filed: Jul. 16, 2019

(86) PCT No.: PCT/DK2019/050228
§ 371 (c)(1),
(2) Date: Jan. 13, 2021

(87) PCT Pub. No.: WO2020/025092
PCT Pub. Date: Feb. 6, 2020

(65) Prior Publication Data
US 2021/0310462 A1 Oct. 7, 2021

(30) Foreign Application Priority Data
Aug. 1, 2018 (DK) .......................... PA 2018 70511

(51) Int. Cl.
*F03D 7/02* (2006.01)
(52) U.S. Cl.
CPC ......... *F03D 7/0236* (2013.01); *F03D 7/0272* (2013.01); *F03D 7/0276* (2013.01);
(Continued)

(58) Field of Classification Search
CPC ...... F03D 7/0236; F03D 7/0276; F03D 7/028; F03D 80/10; F05B 2240/2022; F05B 2240/2213; F05B 2270/101
(Continued)

(56) References Cited

U.S. PATENT DOCUMENTS

| 2,360,792 | A |   | 10/1944 | Putnam |            |
|-----------|---|---|---------|--------|------------|
| 4,419,587 | A | * | 12/1983 | Benton | F03D 7/06  |
|           |   |   |         |        | 416/17     |

(Continued)

FOREIGN PATENT DOCUMENTS

| DE | 102020103271 A1 | * | 8/2021 | .......... F03D 7/0224 |
| EP | 1953383 A1 |  | 8/2008 |

(Continued)

OTHER PUBLICATIONS

Danish Patent and Trademark Office, Search and Examination Report in PA 201870511, dated Feb. 14, 2019.
European Patent Office, International Search Report and Written Opinion in PCT Application No. PCT/DK2019/050228, dated Oct. 1, 2019.

*Primary Examiner* — Topaz L. Elliott
(74) *Attorney, Agent, or Firm* — Wood Herron & Evans LLP (57) ABSTRACT

The present invention relates to a method for operating a wind turbine (1). The wind turbine (1) comprises one or more wind turbine blades (5), each wind turbine blade (5) being connected to a blade carrying structure (4) mounted on a hub (3), via a hinge (6) at a hinge position of the wind turbine blade (5), each wind turbine blade (5) thereby being arranged to perform pivot movements relative to the blade carrying structure (4) between a minimum pivot angle and a maximum pivot angle. The method comprises the steps of detecting an airborne object entering a predefined zone around the wind turbine (1), comparing a current tip height (H) of the wind turbine (1) to a maximum tip height value, (Continued)

the maximum tip height value representing a maximum allowable tip height under currently prevailing conditions. In the case that the current tip height (H) exceeds the maximum tip height value, a pivot angle (P) of wind turbine blades (5) is adjusted in order to decrease the tip height (H) of the wind turbine (1) to a value below the maximum tip height value.

12 Claims, 8 Drawing Sheets

(52) U.S. Cl.
CPC ............... *F05B 2240/2022* (2013.01); *F05B 2240/2213* (2013.01); *F05B 2270/101* (2013.01); *F05B 2270/1032* (2013.01); *F05B 2270/327* (2013.01); *F05B 2270/335* (2013.01); *F05B 2270/805* (2013.01)

(58) Field of Classification Search
USPC .................................................. 416/142, 11
See application file for complete search history.

(56) References Cited

U.S. PATENT DOCUMENTS

| | | | |
|---|---|---|---|
| 4,632,637 A | | 12/1986 | Traudt |
| 4,732,350 A | * | 3/1988 | Lamont ............... B64C 25/40 244/103 S |
| 5,630,705 A | * | 5/1997 | Eikelenboom ........ F03D 7/0252 416/142 |
| 2003/0223868 A1 | | 12/2003 | Dawson et al. |
| 2009/0008939 A1 | | 1/2009 | Pare et al. |
| 2016/0076519 A1 | | 3/2016 | Blake et al. |
| 2018/0171972 A1 | | 6/2018 | Merz et al. |

FOREIGN PATENT DOCUMENTS

| | | | | |
|---|---|---|---|---|
| WO | WO-2011039777 A2 | * | 4/2011 | ........... F03D 7/0224 |
| WO | 2015152847 A1 | | 10/2015 | |
| WO | 2016200270 A1 | | 12/2016 | |

* cited by examiner

METHOD FOR CONTROLLING A TIP HEIGHT OF A WIND TURBINE

FIELD OF THE INVENTION

The present invention relates to a method for operating a wind turbine with one or more wind turbine blades connected pivotally to a blade carrying structure. The method according to the invention results in a wind turbine tip height adjustments in response to an incoming object.

BACKGROUND OF THE INVENTION

Wind turbines may be erected at various locations, such as near airports, on a bird crowd flyway, offshore, on hilltops, etc. At many sites there may be tip height restrictions. These restrictions may be permanent and in that case wind turbines need to be designed with respect to these restrictions. For instance, if the wind turbine is erected near an airport, the tip height of the wind turbine needs to be adapted in accordance with the requirements set by the aviation. In other cases, the tip height restrictions may be temporary, i.e., may depend on a time of the day, or may be dictated by events happening in close surroundings.

For instance, airborne objects such as air planes, air balloons, avian wildlife, etc., may enter a rotational zone of the wind turbine blades. When an airborne object approaches the wind turbine it may be necessary to stop operation of the wind turbine in order to ensure that enough space is provided between the wind turbine blades for the object to pass the wind turbine. When the object leaves the area of the wind turbine, the wind turbine may be restarted. However, by shutting down the wind turbine, power production is lost, influencing the overall power production of the wind turbine. It is therefore desirable to provide a wind turbine which can continue operation, even if incoming airborne objects are detected.

U.S. Pat. No. 4,632,637 discloses a high speed, downwind horizontal axis wind turbine having three circumferentially spaced lightweight blades having inner support arms radially outwardly disposed blade segments which are pivotally connected to the support arms, so as to fold straight downwind under high wind conditions or high rotating speeds.

DESCRIPTION OF THE INVENTION

It is an object of embodiments of the invention to provide a method for operating a wind turbine in such a manner that collisions between the wind turbine and airborne objects can be avoided without significantly reducing power production of the wind turbine.

It is a further object of the invention to provide a method for operating a wind turbine which allows wind turbines with large rotors to be erected in areas with tip height restrictions.

According to a first aspect, the invention provides a method for operating a wind turbine, the wind turbine comprising a tower, at least one nacelle mounted on the tower via a yaw system, a hub mounted rotatably on each nacelle, each hub comprising a blade carrying structure, and one or more wind turbine blades, each wind turbine blade being connected to the blade carrying structure via a hinge at a hinge position of the wind turbine blade, each wind turbine blade thereby being arranged to perform pivot movements relative to the blade carrying structure between a minimum pivot angle and a maximum pivot angle, the method comprising the steps of:

detecting an airborne object entering a predefined zone around the wind turbine, comparing a current tip height of the wind turbine to a maximum tip height value, the maximum tip height value representing a maximum allowable tip height under currently prevailing conditions, and in the case that the current tip height exceeds the maximum tip height value, adjusting the pivot angle of the wind turbine blades in order to decrease the tip height of the wind turbine to a value below the maximum tip height value.

Thus, according to the first aspect, the invention provides a method for controlling a wind turbine comprising a tower with at least one nacelle mounted on the tower via a yaw system. The wind turbine may comprise only one nacelle, in which case the wind turbine is of a single rotor type. In this case the nacelle will typically be mounted on top of the tower. Alternatively, the wind turbine may comprise two or more nacelles, in which case the wind turbine is of a multirotor type. In this case at least some of the nacelles may be mounted directly on the tower and/or at least some of the nacelles may be mounted on the tower via load carrying structures, e.g. comprising arms extending in a direction away from the centre axis of the tower. Each nacelle may be mounted on the tower via a separate yaw system, or two or more nacelles may be mounted on the tower via a common yaw system, in which case these nacelles are yawed together relative to the tower.

In any event, since the nacelle(s) is/are mounted on the tower via a yaw system, they can rotate about a substantially vertical rotational axis, relative to the tower, in order to direct one or more rotors of the wind turbine in accordance with the incoming wind. The yaw system may be an active yaw system in which the nacelle is rotated actively by means of a yaw drive mechanism, e.g. on the basis of measurements of the wind direction. As an alternative, the yaw system may be a passive yaw system in which the nacelle automatically rotates according to the wind direction without the use of a yaw drive mechanism. As another alternative, the yaw system may be a combination of an active yaw system and a passive yaw system, in the sense that it may operate actively under some circumstances and passively under other circumstances.

One or more nacelles may be traditional nacelles having an outer wall enclosing an interior of the nacelle, the nacelle housing various components of the wind turbine, such as generator, drive train, etc. As an alternative, the nacelles may simply be a structure which is capable of performing yawing movements relative to the tower. In this case some or all of the components described above may be arranged outside the nacelle, e.g. in an interior part of the tower.

A hub is mounted rotatably on each nacelle. Each hub comprises a blade carrying structure having one or more wind turbine blades connected thereto. Accordingly, the wind turbine blades rotate along with the hub and the blade carrying structure relative to the nacelle.

The wind turbine is preferably a horizontal axis wind turbine.

In the present context the term 'wind turbine blade' should be interpreted to mean a component which is connected to the blade carrying structure via a hinge. The component will define an aerodynamic profile in some or all sections but might have arms and counterweights in other sections, i.e. it might have sections with less or no contribution to the power production of the wind turbine.

Each of the wind turbine blades is connected to the blade carrying structure via a hinge at a hinge position of the wind turbine blade. Thereby each of the wind turbine blades is arranged to perform pivot movements relative to the blade carrying structure, via the hinge. A pivot angle is thereby defined between each wind turbine blade and the blade carrying structure, depending on the position of the hinge and thereby of the wind turbine blade relative to the blade carrying structure. Accordingly, the pivot angle defines the direction along which a given wind turbine blade extends relative to the blade carrying structure, and thereby relative to the hub. This, in turn, determines a diameter of the rotor, and thereby the ability of the wind turbine to extract energy from the wind.

It is not ruled out that each wind turbine blade could be connected to the blade carrying structure via two or more hinges.

The pivot angle can vary between a minimum pivot angle, defining a maximum rotor diameter, and a maximum pivot angle, defining a minimum rotor diameter. The hinge may be or comprise a bearing, e.g. in the form of a journal bearing, a roller bearing, or any other suitable kind of bearing.

According to the method of the first aspect of the invention, an airborne object entering a predefined zone around the wind turbine is initially detected. The airborne object may be an airplane, one or more birds, bats, insects, etc. The airborne object may also refer to a heavy rain, hail, snow, or similar falling within the predefined zone around the wind turbine. The predefined zone around the wind turbine may relate to an area around the wind turbine extending substantially horizontally from the position of the wind turbine and within a certain distance from the tower. The predefined zone defines an area within which the wind turbine is positioned, and having a boundary which is arranged at a distance from the wind turbine, where there is a risk that incoming airborne objects coming closer to the wind turbine than this boundary may collide with the wind turbine. The distance between the wind turbine and the boundary of the predefined zone may, in one example, be one kilometre, but may depend of the kind of airborne object being detected, and could be several kilometres.

When an airborne object enters the predefined zone around the wind turbine, there is a risk of collision between the airborne object and the wind turbine. If the wind turbine is erected near an airport, airplanes flying above the wind turbine may require limited maximum tip height of the wind turbine, providing a safety clearance. The tip height of the wind turbine may be too high to provide this safety clearance. In the case that the airborne object is in the form of animal life, such as one or more birds, the birds may be killed during collision with the wind turbine blades, which is detrimental to the wildlife. Furthermore, such collisions might cause damage to the wind turbine blades. During insect swarming a large number of insects may appear in the predefined zone of the wind turbine, and collisions between the insects and the wind turbine blades may occur. This leads to fouling of the wind turbine blades, which has a highly detrimental effect on the aerodynamic profile of the wind turbine blades, and thereby on the ability of the wind turbine to extract energy from the wind.

When the airborne object enters the predefined zone around the wind turbine, its presence is detected, e.g. by the wind turbine itself or by means of a separate detector or surveillance system. The detection may be performed by various detection means such as sensors, radars, lidars, cameras, and similar which have a reach which at least allows the detection means to monitor the boundaries of the predefined zone. The detection means may be in communication with or form part of a control unit of the wind turbine or a wind farm in which the wind turbine may be located, and send a signal as soon as the object is identified such that the control unit can control the wind turbine timely. The detection means may either constantly or intermittently monitor the predefined zone around the wind turbine and apart from detecting a presence of the object, it may also identify a size and shape of the object, its distance from the wind turbine, its speed and/or direction of motion.

A current tip height value is then compared with a maximum allowable tip height value. The current tip height value represents the tip height at the moment of detection of the object, or at the moment when the detection signal is communicated from the detection means to the control unit. The current tip height may have any value ranging from its maximum value, which corresponds to the maximum rotor diameter and the minimum pivot angle, to its minimum value, which corresponds to the minimum rotor diameter and the maximum pivot angle between the wind turbine blade and the blade carrying structure.

The maximum allowable tip height value represents the maximum allowable tip height which the wind turbine is allowed to have under the prevailing conditions in real time. The maximum tip height value may be a fixed value which is established by the control unit based on the position of the airborne object and its direction of motion. The prevailing conditions typically relate to the detected airborne object, its size, the distance from the wind turbine, the height, speed and direction of motion, and similar. The prevailing conditions may also include ambient conditions such as wind speed, wind direction, precipitation, time of the day, etc.

The comparison may be performed at the control unit of the wind turbine, or at a separate control unit. The control unit can resolve whether the current tip height is below or above the maximum allowable tip height value.

Finally, in the case that the comparison reveals that the current tip height exceeds the maximum allowable tip height value, the pivot angle of the wind turbine blades is adjusted in order to decrease the tip height of the wind turbine to a value below the maximum tip height value. Thereby it is ensured that the tip height of the wind turbine fulfils any restrictions which are currently required.

For wind turbines with hinged wind turbine blades, the pivot angle which can vary determines the rotor diameter and therefore the tip height which may also vary accordingly. Thereby the wind turbine is operated with a decreased tip height, lower than the maximum allowable tip height value.

By having a method for operating the wind turbine in such a manner that the tip height can be reduced if the airborne object is detected, collisions are avoided while the wind turbine keeps operating and therefore keeps producing power.

This is possible because the hinged wind turbine blades allow the diameter of the rotor to be varied, thereby allowing the tip height of the wind turbine to be decreased when this is required. Accordingly, collision with an airborne object can be avoided, while maintaining the power production of the wind turbine. Furthermore, when no airborne objects are detected, the wind turbine can be operated at full tip height, and thereby with maximum rotor diameter which provides substantially larger power production which is of great benefit. Thereby it is possible to erect wind turbines with large rotor diameters in regions with tip height restrictions, such as near airports or on bird migration routes, without having to design the wind turbine with a permanent low tip height.

It should be noted that even though the present disclosure refers to tip height and airborne objects, the principles underlying the present invention could also be applied to avoiding collisions with ground based objects, such as vehicles or persons. When the pivot angle is adjusted as described above, it not alone causes a decrease in the tip height. It also causes an increase in the minimum distance between the ground and the tips of the wind turbine blades, i.e. the clearance between the ground and the wind turbine blades is increased. Accordingly, a similar procedure could be applied in the case that it is detected that a ground based object enters the predefined zone, thereby providing sufficient clearance only when this occurs.

The wind turbine blades may each define an inner tip end and an outer tip end forming an extremity of the wind turbine blade being arranged closest to the hub and an extremity of the wind turbine blade being arranged furthest away from the hub, respectively.

The hinge position may be arranged at a distance from the inner tip end and at a distance from the outer tip end. In this case, the wind turbine blade is hinged to the blade carrying structure at a position which is not at an end of the wind turbine blade. The wind turbine blades may then have a centre of mass for the wind turbine blade at rest which is positioned between the hinge position and the inner tip end of the wind turbine blade. In this case, the centre of mass for the wind turbine blade is arranged in a part of the wind turbine blade which is arranged closer to the hub than the hinge position. When the hub rotates relative to the nacelle, a centrifugal force acts on each of the wind turbine blades, at the position of the centre of mass. Thereby the centrifugal force will tend to push the part of the wind turbine blade arranged between the hinge position and the inner tip end, i.e. the part of the wind turbine blade where the centre of mass is arranged, in an outwards direction. This will cause the wind turbine blades to pivot via the hinges in such a manner that the wind turbine blades are rotated towards a position where the longitudinal direction of the wind turbine blades is arranged substantially parallel to the rotational axis of the hub. Thereby the wind turbine blades are pivoted in such a manner that the pivot angle is increased and the diameter of the rotor is reduced. The higher the rotational speed, the further the wind turbine blades will be pivoted towards this position.

Thus, according to this embodiment, the diameter of the rotor is automatically reduced as the rotational speed of the hub increases. Accordingly, the rotor diameter, and thereby the ability of the wind turbine to extract energy from the wind, is automatically adjusted according to the prevailing wind speed, without requiring complicated control algorithms or maintenance requiring mechanical parts, such as pitch mechanisms, etc.

As an alternative, the diameter of the rotor may be controlled in any other suitable manner, e.g. using suitable control algorithms.

Alternatively or additionally, aerodynamic forces acting on the aerodynamic profiles of the wind turbine blades may cause the wind turbine blades to pivot in such a manner that the diameter of the rotor is reduced as the wind speed increases. In a preferred embodiment, the centrifugal force and the aerodynamic forces cooperate in reducing the rotor diameter as the wind speed increases, i.e. they are not counteracting each other. This could, e.g., be obtained when the centre of mass of the wind turbine blades is arranged between the inner tip end of the wind turbine blades and the hinge position, as described above. For some wind turbines, e.g. small wind turbines, the centrifugal force may be the dominating factor with respect to ensuring that the wind turbine blades are pivoted towards smaller rotor diameter. For other wind turbines, e.g. larger wind turbines, the aerodynamic forces may be the dominating factor.

In other embodiments, the centre of mass of the wind turbine blades may be arranged at the hinge position or between hinge position and the outer tip end of the wind turbine blade. Thus results in either neutral centrifugal forces or centrifugal forces acting towards moving the wind turbine blade towards a position defining a minimum pivot angle as the rotational speed increases.

As an alternative, the hinge position may be arranged at the inner tip end. In this case, an active mechanism may be required in order to pivot the wind turbine blades. However, aerodynamic forces acting on the wind turbine blades may assist in pivoting the wind turbine blades.

The method may further comprise the step of applying a biasing force to the wind turbine blades which biases the wind turbine blades towards a position defining a minimum pivot angle, and the step of adjusting the pivot angle of the wind turbine blades may comprise reducing the biasing force applied to the wind turbine blades.

According to this embodiment, the wind turbine blades are biased towards a position defining a minimum pivot angle, and thereby a maximum rotor diameter. The wind turbine blades are allowed to pivot as described above, but pivoting movements towards a position defining a maximum pivot angle are performed against the applied biasing force. In the case that the wind turbine blades are of a kind in which the pivot angle is automatically adjusted in response to the rotational speed of the wind turbine, the applied biasing force defines the equilibrium position, and thereby the pivot angle, for a given rotational speed.

When an adjustment of the pivot angle is required in order to adjust the tip height of the wind turbine, the biasing force applied to the wind turbine blades is adjusted. In the case that a smaller tip height is required, then the biasing force applied to the wind turbine blades is reduced. Thereby the wind turbine blades are biased towards the minimum pivot angle with a smaller force, and it becomes easier to move the wind turbine blades towards the maximum pivot angle. Accordingly, the equilibrium position for a given rotational speed changes in such a manner that a smaller rotor diameter, and thereby a lower tip height, is obtained at a given rotational speed.

When the airborne object leaves the predefined zone the tip height may need to be increased and in that case the biasing force applied to the wind turbine blades is increased. Thereby the wind turbine blades are biased towards the minimum pivot angle with a larger force, and it becomes more difficult to move the wind turbine blades towards the maximum pivot angle. Accordingly, the equilibrium position for a given rotational speed changes in such a manner that a larger rotor diameter is obtained at a given rotational speed.

The biasing force could, e.g., be applied by means of wires attached to an inner part of the wind turbine blades, which pull the wind turbine blades outwards, i.e. towards the minimum pivot angle and maximum rotor diameter. In this case the biasing force can be adjusted by adjusting the pulling force applied by the wires.

As an alternative, the biasing force could be applied by means of one or more springs acting in the wind turbine blades, e.g. compressible springs arranged for pulling or pushing the wind turbine blades towards the minimum pivot angle and maximum rotor diameter. In this case the biasing force can, e.g., be adjusted by means of pulleys or hydraulic actuators mounted in the hub, in the blade carrying structure, in the wind turbine blade itself, in the nacelle or in the tower.

As another alternative, the biasing force could be in the form of a moment. In this case the biasing force could be applied by means of a torsional spring arranged in the hinge which pulls or pushes the wind turbine blades towards the minimum pivot angle and maximum rotor diameter. In this case the biasing force may also be adjusted by varying the torsional moment, e.g. by means of pulleys or hydraulic actuators mounted in the hub, in the blade carrying structure, in the wind turbine blade itself, in the nacelle or in the tower.

As another alternative, the biasing force could be applied by means of hydraulic mechanisms connected to the wind turbine blades and being arranged for pulling or pushing the wind turbine blades towards the minimum pivot angle and maximum rotor diameter. In this case the biasing force can be adjusted by adjusting the pressure in the hydraulic mechanisms.

Alternatively, the step of adjusting the pivot angle of the wind turbine blades may comprise applying a force to the wind turbine blades which causes the wind turbine blades to move towards a position which increases the pivot angle.

According to this embodiment, instead of biasing the wind turbine blades towards a position defining a minimum pivot angle, a force can be applied to the wind turbine blades which moves them in the opposite direction, i.e. towards a position defining a maximum pivot angle, and thereby a minimum rotor diameter. The mechanism which provides the pivot movements of the wind turbine blades may, in this case, advantageously be an active mechanism, which moves the wind turbine blades to a specific pivot angle, e.g. in response to a suitable control signal.

When an adjustment of the pivot angle is required in order to adjust the tip height of the wind turbine, the applied force is adjusted. In the case that a smaller tip height is required, then the applied force is increased, and in the case that a larger tip height is required, then the applied force is decreased.

The force could, e.g., be applied by means of wires attached to the outer part of the wind turbine blades, which pull the wind turbine blades inwards, i.e. towards the maximum pivot angle and minimum rotor diameter. In this case the force can be adjusted by adjusting the pulling force applied by the wires.

As an alternative, the force could be applied by means of one or more springs acting in the wind turbine blades, e.g. compressible springs arranged for pulling or pushing the wind turbine blades towards the maximum pivot angle and minimum rotor diameter. In this case the force can, e.g., be adjusted by means of pulleys or hydraulic actuators mounted in the hub, in the blade carrying structure, in the wind turbine blade itself, in the nacelle or in the tower.

As another alternative, the force could be in the form of a moment. In this case the biasing force could be applied by means of a torsional spring arranged in the hinge which pulls or pushes the wind turbine blades towards the maximum pivot angle and minimum rotor diameter. In this case the force may also be adjusted by varying the torsional moment, e.g. by means of pulleys or hydraulic actuators mounted in the hub, in the blade carrying structure, in the wind turbine blade itself, in the nacelle or in the tower.

As another alternative, the force could be applied by means of hydraulic mechanisms connected to the wind turbine blades and being arranged for pulling or pushing the wind turbine blades towards the maximum pivot angle and minimum rotor diameter, and thereby minimum tip height.

In this case the force can be adjusted by adjusting the pressure in the hydraulic mechanisms.

Yet another alternative for adjusting the pivot angle of the wind turbine blades may comprise adjusting a rotational speed of the wind turbine and/or a generator torque of the wind turbine. In the present context the term 'rotational speed' should be interpreted to mean the angular velocity at which the hub rotates during operation, and the term 'generator torque' should be interpreted to mean the torque supplied to the generator. The rotational speed may, e.g., be adjusted by changing the generator torque. The generator torque may be adjusted by, e.g., adjusting the current in the generator via a frequency converter. In the case that the wind turbine is of a kind which automatically reduces the rotor diameter when the rotational speed is increased, e.g. due to centrifugal forces and/or aerodynamic forces acting on the wind turbine blades, an adjustment of the rotational speed and/or the generator torque will automatically result in an adjustment of the rotor diameter, and thereby of the tip height. For instance, in the case of low wind speed, the generator may be used for increasing the rotational speed of the rotor, in order to cause the wind turbine blades to pivot towards maximum pivot angle and minimum rotor diameter, e.g. due to centrifugal forces and/or aerodynamic forces acting on the wind turbine blades.

The method may further comprise the step of calculating the maximum tip height value based on a maximum allowable tip speed value. In the present context the term 'tip speed' should be interpreted to mean the velocity of the outer tip ends of the wind turbine blades as they rotate along with the hub during operation of the wind turbine. Under certain circumstances it may be desired to decrease the tip speed. This is, e.g., the case when the detected airborne object is in the form of one or more birds or swarming insects, because a high tip speed is known to cause a high risk of collisions between birds or insects and wind turbine blades. Lowering the tip speed will therefore reduce the risk of collisions in this case.

The maximum allowable tip speed value represents the maximum tip speed which the wind turbine is allowed to have under the prevailing conditions in real time. The prevailing conditions may, thus, relate to a physical object approaching the wind turbine or they may relate to ambient conditions such as heavy rain, snow, hail, sand storm, or similar. For instance, if a flock of birds or an insect swarm approaches the wind turbine, based on the information collected by the detection means the control unit may calculate that the flock may pass the wind turbine within a certain time period. In this case it may be beneficial to decrease the tip speed of the wind turbine as it may allow the flock/swarm to pass between the wind turbine blades. The maximum allowable tip height may, in this case, be higher than the position of the flock/swarm, but adapted in accordance to the maximum allowable tip speed. In another example, under heavy precipitation, a protection of the leading edges of the wind turbine blades from erosion over time may be the reason for reducing the tip speed. The tip speed required for the protection may then be used for calculating the maximum allowable tip height. This calculation may be based on power optimization, i.e., defining an optimal pair of rotor diameter, and thereby tip height, and rotational speed of the wind turbine. Once the heavy precipitation stops, the tip speed, and thereby the tip height, may be changed to the previous value.

In yet another example, a service and wind turbine blade inspection may reveal that a certain level of leading edge erosion exists on the wind turbine blades. The tip speed value may then be reduced for a period until the leading edges of the wind turbine blades have been repaired in a planned blade service. The tip height and rotational speed may also be adjusted accordingly, as described above. By adjusting the tip height based on the maximum allowable tip speed, existence of airborne objects and/or ambient conditions in the proximity of the wind turbine may be handled while the wind turbine continues to generate power.

The step of detecting an airborne object may be performed by means of radar detection. A radar system installed on a wind turbine or wind farm may continuously and autonomously scan the predefined zone around the wind turbine. The radar system may have an instrument range up to 36 kilometres or more. If, for instance, an approaching aircraft is detected, its distance, speed, and heading are tracked and an automatic assessment may be made on whether or not tip height adjustment is needed. The assessment may then be sent to the control unit which can simultaneously control the wind turbine blades accordingly. Alternatively, the detection may be performed by sensors, lidars, visual means such as cameras, audio means such as microphones, transponders, and the like. Each wind turbine of the wind farm may be equipped with one or more detection means monitoring only the predefined zone of the wind turbine to which they are mounted. Alternatively, one or more detection means may cover predefined zones of several wind turbines. The detection means may be in communication with the control unit sending captured signals for further analysis. Cameras used for visual monitoring of the predefined zones may perform digital image processing before sending the captured image to the control unit. Multiple cameras may be used for monitoring the area, and obtained images may be combined into one which may then be sent to the control unit. Furthermore, microphones may be configured to detect a frequency emitted by birds within the predefined zone.

The method may further comprise the step of adjusting the pivot angle of the wind turbine blades in order to decrease the tip height of the wind turbine based on a time condition. For instance, tip height restrictions may be stricter during night time than during daytime due to lower visibility, especially if the maximum tip height value is based on output from cameras and other visual sensors. Therefore the maximum allowable tip height value may be higher during daytime than during night time. This is particularly relevant in the case that the airborne object is an airplane. Furthermore, insect swarms are more frequent during dusk, and stricter tip height restrictions may therefore be applied during dusk, in particular at sites with many insects, such as near swamps.

The tip height may also be adjusted during certain periods throughout the year, e.g., during migrations of birds. Furthermore, the restriction on the tip height or tip speed may be controlled by a weather forecast, i.e., if a heavy precipitation, e.g. in the form of rain, snow storm, excessive wind, hail, etc. is forecasted, the tip height may be controlled accordingly to avoid damage of the wind turbine.

The method may further comprise the steps of:
  detecting that the airborne object is no longer within the predefined zone around the wind turbine, and
  adjusting the pivot angle of the wind turbine blades in order to increase the tip height of the wind turbine.

The detection means may continue monitoring the predefined zone around the wind turbine after the tip height has been adjusted. At a certain point in time, the airborne object leaves the predefined zone, and is therefore no longer relevant for the wind turbine operation. At that moment, the detection means may communicate to the control unit that the predefined zone is free of the airborne object(s), and the control unit may then control the wind turbine without tip height restrictions, e.g. by adjusting the pivot angle of the wind turbine blades such that the tip height of the wind turbine is increased. If all the conditions relevant for wind turbine operation are optimal, the rotor diameter may be brought to its maximum. Adjusting the pivot angle when the airborne object is no longer within the predefined zone ensures that the wind turbine is operated in an optimal manner at all times.

The method may further comprise the step of generating a signal indicating the current tip height of the wind turbine. The indicating signal may be in a form of a visible light signal, an audio signal, an electronic signal, a radio signal, etc. Visible light of different colours and/or intensity may be generated by, e.g., LEDs installed at the tip of the wind turbine blades. Thereby an incoming airplane is not only warned that a wind turbine is present, but the colour, intensity and/or pattern also informs the pilot of the current tip height of the wind turbine, and the pilot can therefore take this into account when steering the airplane past the wind turbine.

Electronic signals and/or radio signals may be generated by the wind turbine and communicated to incoming airplanes informing them about the tip height of the wind turbine. Thereby the pilot may receive an on-screen message informing him of the current tip height of the wind turbine, and he can therefore readily take this into account when steering the airplane past the wind turbine.

An audio alarm may be generated when, e.g., a flock of birds is detected. This may for instance be noise at frequencies that birds dislike. By providing signalling only when needed, i.e., when an object is approaching the wind turbine, unnecessary continuous signalling is avoided.

According to a second aspect, the invention provides a wind turbine comprising a tower, at least one nacelle mounted on the tower via a yaw system, a hub mounted rotatably on each nacelle, each hub comprising a blade carrying structure, and one or more wind turbine blades, each wind turbine blade being connected to the blade carrying structure via a hinge at a hinge position of the wind turbine blade, each wind turbine blade thereby being arranged to perform pivot movements relative to the blade carrying structure between a minimum pivot angle and a maximum pivot angle, wherein the wind turbine further comprises a mechanism arranged to adjust the pivot angle of the wind turbine blades towards a position defining a maximum pivot angle in response to a signal indicating that an airborne object entering a predefined zone around the wind turbine has been detected.

The wind turbine according to the second aspect of the invention may be controlled by means of the method according to the first aspect of the invention. The skilled person would therefore readily understand that any feature described in combination with the first aspect of the invention could also be combined with the second aspect of the invention, and vice versa. Accordingly, the remarks set forth above with reference to the first aspect of the invention are equally applicable here.

The wind turbine may further comprise a biasing mechanism arranged to apply a biasing force to the wind turbine blades which biases the wind turbine blades towards a position defining a minimum pivot angle, and the mechanism arranged to adjust the pivot angle of the wind turbine blades may be arranged to reduce the applied biasing force. This has already been described above with reference to the first aspect of the invention.

The wind turbine may be a downwind wind turbine. According to this embodiment, the rotor faces away from the incoming wind, i.e. the wind reaches the wind turbine blades after having passed the nacelle. Downwind wind turbines are very suitable for applying passive yaw systems, i.e. yaw systems which automatically direct the rotor of the wind turbine in accordance with the incoming wind without the use of yaw drives and control systems. This further reduces the need for components which are prone to require maintenance. Furthermore, in downwind wind turbines a passive cooling system can be arranged upwind with respect to the rotor, thereby enabling improved cooling of various wind turbine components.

As an alternative, the wind turbine may be an upwind wind turbine, in which case the rotor faces the incoming wind.

BRIEF DESCRIPTION OF THE DRAWINGS

The invention will now be described in further detail with reference to the accompanying drawings in which.

DETAILED DESCRIPTION OF THE DRAWINGS

Figure 1:
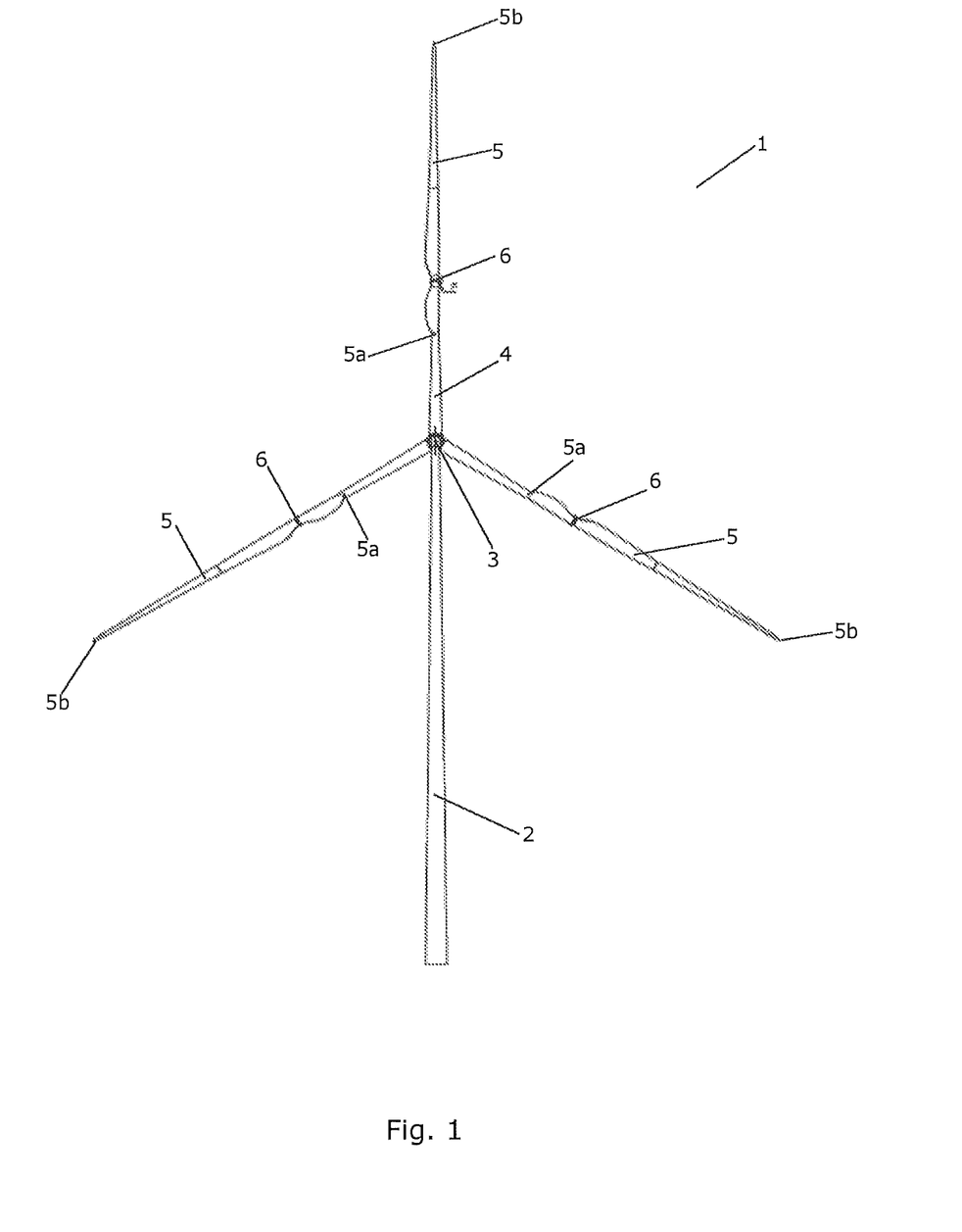
FIG. 1 is a front view of a wind turbine according to an embodiment of the invention.

FIG. 1 is a front view of a wind turbine 1 according to an embodiment of the invention. The wind turbine 1 comprises a tower 2 and a nacelle (not visible) mounted on the tower 2. A hub 3 is mounted rotatably on the nacelle, the hub 3 comprising a blade carrying structure 4 with three arms. A wind turbine blade 5 is connected to each of the arms of the blade carrying structure 4 via a hinge 6. Thus, the wind turbine blades 5 rotate along with the hub 3, relative to the nacelle, and the wind turbine blades 5 can perform pivoting movements relative to the blade carrying structure 4, via the hinges 6.

Each wind turbine blade 5 defines an aerodynamic profile extending along the length of the wind turbine blade 5 between an inner tip end 5a and an outer tip end 5b. The hinge 6 is arranged at a hinge position of the wind turbine blade 5, the hinge position 6 being at a distance from the inner tip end 5a as well as at a distance from the outer tip end 5b.

Figure 2:
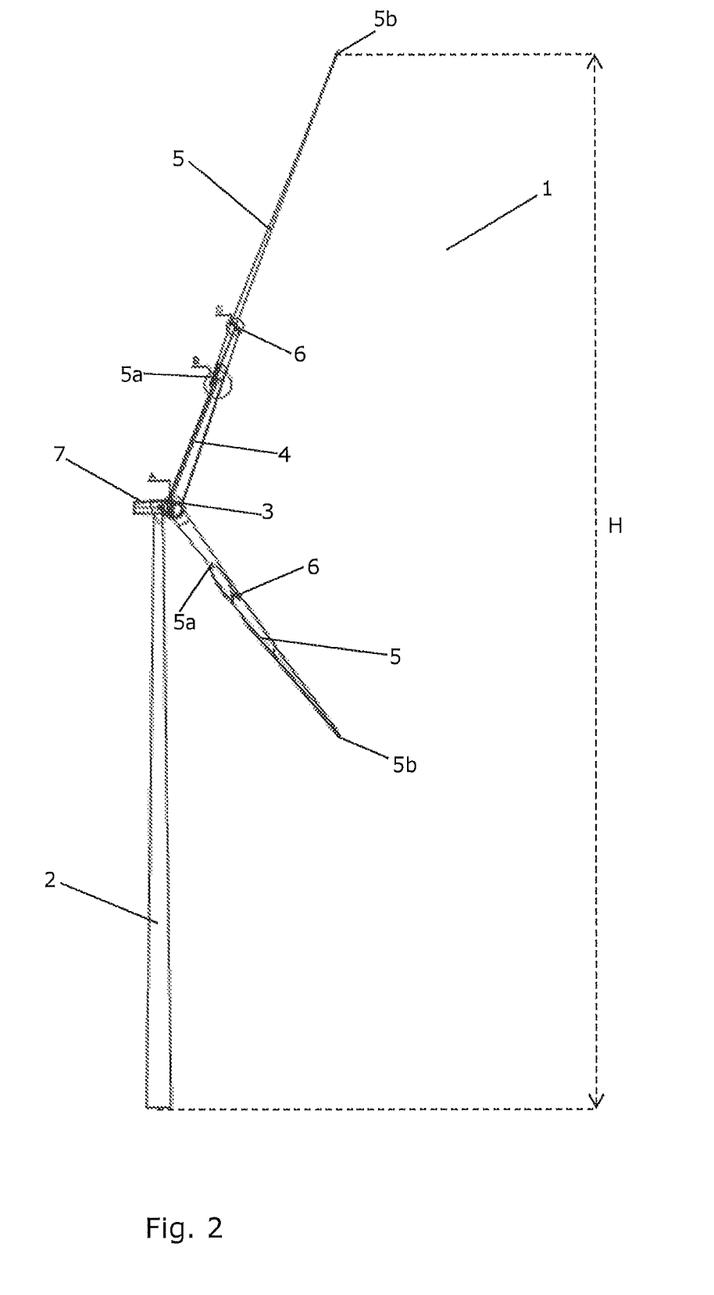
FIGS. 2 and 3 are side views of the wind turbine of FIG. 1 with the wind turbine blades at two different pivot angles.

FIG. 2 is a side view of the wind turbine 1 of FIG. 1 with the wind turbine blades 5 positioned at a minimum pivot angle, i.e. at a pivot angle which results in a maximum rotor diameter of the wind turbine 1, and therefore a maximum tip height H of the wind turbine 1. In FIG. 2 the nacelle 7 can be seen. The wind turbine blades 5 are biased towards this position by means of a wire attached to the inner part of the wind turbine blades 5, i.e. at a position between the hinge 6 and the inner tip end 5a. This will be described in further detail below with reference to FIGS. 4 and 5.

Figure 3:
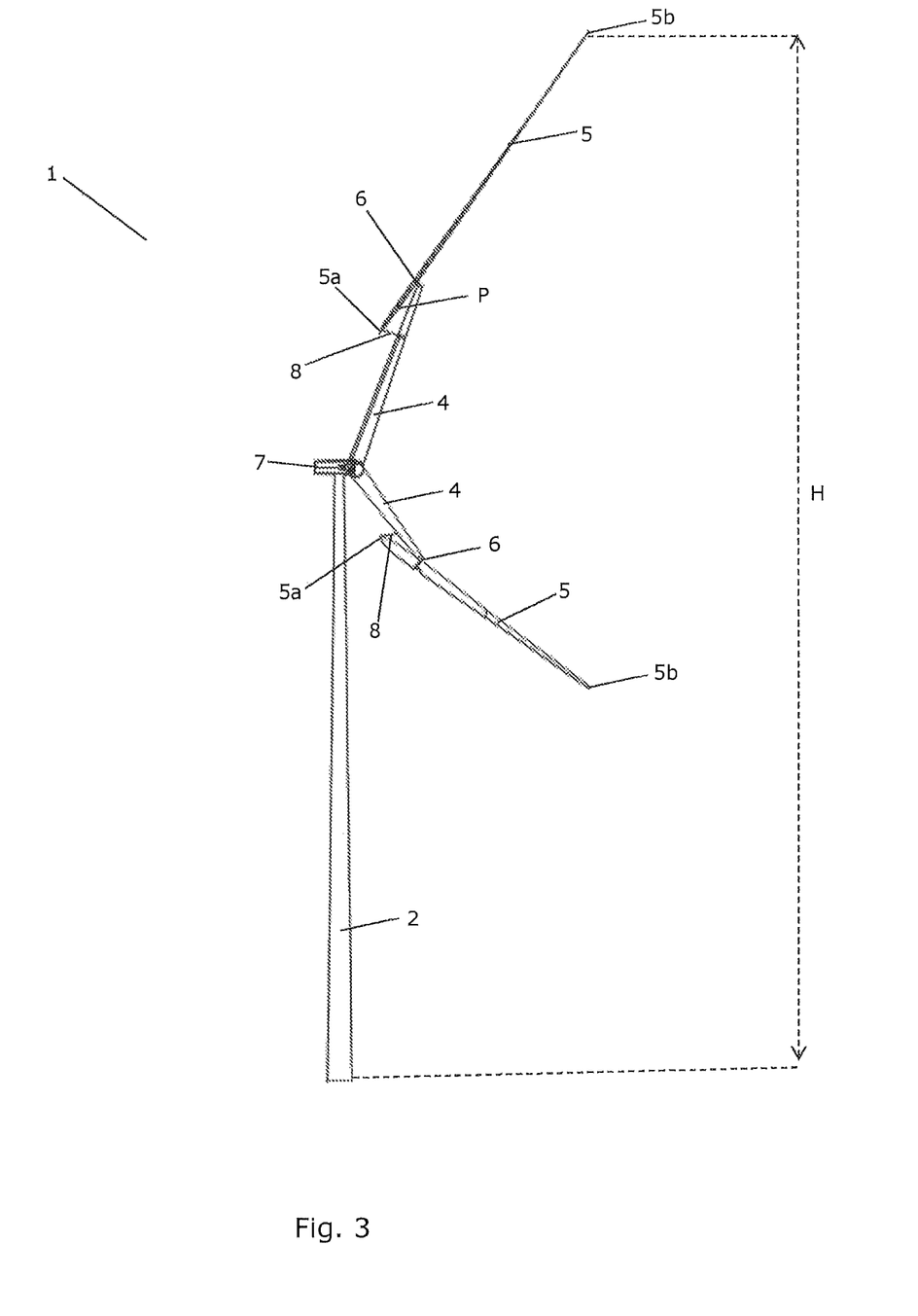

FIG. 3 is a side view of the wind turbine 1 of FIGS. 1 and 2. In FIG. 3 the wind turbine blades 5 are positioned at a larger pivot angle P than the minimum pivot angle of FIG. 2. Thereby the rotor diameter of the wind turbine 1 is smaller in the situation illustrated in FIG. 3 than in the situation illustrated in FIG. 2.

By reducing the rotor diameter, the tip height H of the wind turbine 1 is also decreased. Collision between the wind turbine 1 and an airborne object which enters a predefined zone around the wind turbine 1 can thereby be avoided.

Since the probability of collision between the wind turbine 1 and the airborne object depends strongly on the tip height, the probability of collision is thereby lower in the situation illustrated in FIG. 3 than in the situation illustrated in FIG. 2. In FIG. 3 a portion of the wires 8 pulling the wind turbine blades 5 towards the minimum pivot angle position can be seen.

The wind turbine 1 of FIGS. 1-3 may be operated in the following manner. Initially the wind turbine 1 is operated in an ordinary manner, extracting as much energy as possible from the wind. The wires 8 bias the wind turbine blades 5 towards the minimum pivot angle position, as illustrated in FIG. 2, while centrifugal forces acting on the wind turbine blades 5 and possibly aerodynamic forces acting on the wind turbine blades 5 attempt to move the wind turbine blades 5 towards larger pivot angles in such a manner that the higher the rotational speed of the wind turbine 1, the larger the combined centrifugal and aerodynamic force will be. Thus, for a given wind speed, and thereby a given rotational speed of the wind turbine 1, an equilibrium is obtained which positions the wind turbine blades 5 at a certain pivot angle.

At a certain point in time, an airborne object entering a predefined zone around the wind turbine 1 is detected, and a maximum allowable tip height value is provided. The airborne object could, e.g., be in the form of an airplane, one or more birds, insect swarms, etc. The maximum allowable tip height value represents the maximum allowable tip height which the wind turbine 1 is allowed to have under the prevailing conditions in real time, in particular given that the detected airborne object is entering the predefined zone around the wind turbine 1. The maximum tip height value may be a fixed value which is established by the control unit based on the position of the airborne object and its direction of motion.

The current tip height H of the wind turbine 1 is then compared to the maximum allowable tip height value. In the case that it is revealed that the current tip height H exceeds the maximum allowable tip height value, the tip height H of the wind turbine 1 needs to be reduced to be below the maximum allowable tip height value. Accordingly, the pivot angle of the wind turbine blades 5 is adjusted to a pivot angle P which results in a tip height H which is below the maximum allowable tip height value. Operating the wind turbine 1 with the wind turbine blades 5 arranged at this pivot angle P will, accordingly, have the consequence that the maximum allowable tip height value is not exceeded.

The pivot angle P of the wind turbine blades 5 may be adjusted in the following manner. As described above, the wires 8 pull the wind turbine blades 5 towards a position defining a minimum pivot angle, and thereby a maximum rotor diameter of the wind turbine 1. In the case that it is necessary to reduce the tip height H in order to avoid collision with an incoming airborne object, the pulling force applied to the wind turbine blades 5 by the wires 8 is reduced. This allows the wind turbine blades 5 to more easily move towards a larger pivot angle, and thereby towards a smaller rotor diameter and lower tip height. Accordingly, the wind turbine 1 will be operated with a smaller rotor diameter, and thereby with a lower tip height. This prevents collisions between the airborne objects and the wind turbine 1 while maintaining power production.

The wind turbine 1 illustrated in FIG. 2 is operated at maximum rotor diameter, e.g. with a maximum force applied to the wind turbine blades 5 by the wires 8. In the wind turbine 1 of FIG. 2, the force applied to the wind turbine blades 5 by the wires 8 has been decreased, resulting in an increased pivot angle P, a decreased rotor diameter, a reduced tip height H, and thereby avoiding collision with the airborne object while maintaining power production by the wind turbine 1.

By operating the wind turbine 1 in such a manner that the tip height H is reduced if an airborne object is detected, collisions are avoided while the wind turbine 1 keeps operating and therefore keeps producing power. This is possible because the pivoting wind turbine blades 5 allow the rotor diameter to be varied, thereby adjusting the tip height H of the wind turbine 1. Accordingly, an airborne object can be avoided while power production of the wind turbine 1 is maintained.

Figure 4:
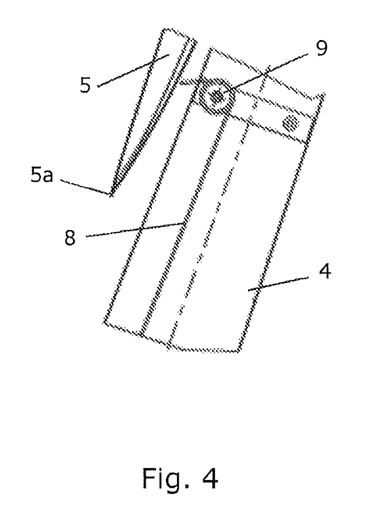
FIGS. 4 and 5 show details of a mechanism for adjusting a pivot angle of wind turbine blades of a wind turbine according to an embodiment of the invention.
Figure 5:
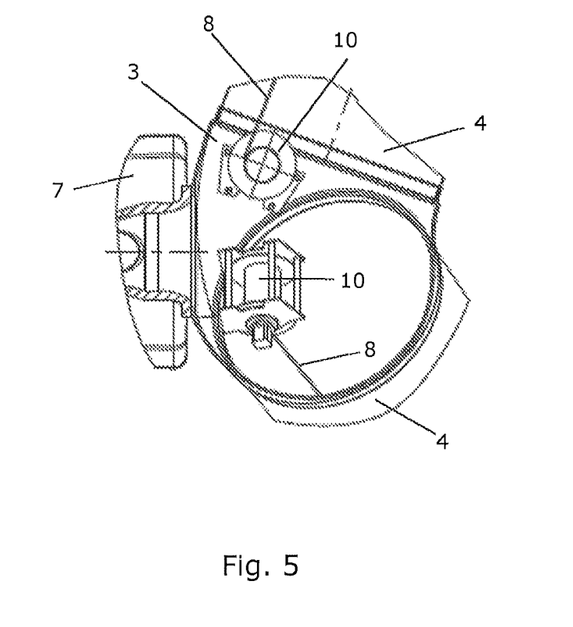

FIGS. 4 and 5 show details of a mechanism for adjusting a pivot angle of wind turbine blades 5 of a wind turbine according to an embodiment of the invention. The wind turbine could, e.g., be the wind turbine 1 of FIGS. 1-3.

FIG. 4 shows a portion of a blade carrying structure 4 and a portion of a wind turbine blade 5. The wind turbine blade 5 is pivotally mounted on the blade carrying structure 4 via a hinge (not shown). A wire 8 is connected to the wind turbine blade 5 at a position between an inner tip end 5a of the wind turbine blade 5 and the position of the hinge. The wire 8 extends from the connecting position at the wind turbine blade 5, via a pulley 9 and along the blade carrying structure 4 towards a hub (not shown).

A pulling force applied by means of the wire 8 pulls the wind turbine blade 5 towards a position defining a minimum pivot angle. In FIG. 4 the wind turbine blade is arranged at the minimum pivot angle. Reducing the pulling force applied by means of the wire 8 will allow the wind turbine blade 5 to more easily pivot towards larger pivot angles, in the manner described above with reference to FIGS. 1-3.

FIG. 5 is a cross sectional view of part of a hub 3 and part of a nacelle 7. Arms of a blade carrying structure 4 are mounted on the hub 3. The wires 8 which are also illustrated in FIG. 4 are connected to winch mechanisms 10 arranged in the hub 3. Thereby the pulling force applied by means of the wires 8 can be adjusted by rotating the winch mechanisms 10, thereby adjusting the length of the wires 8.

Figure 6:
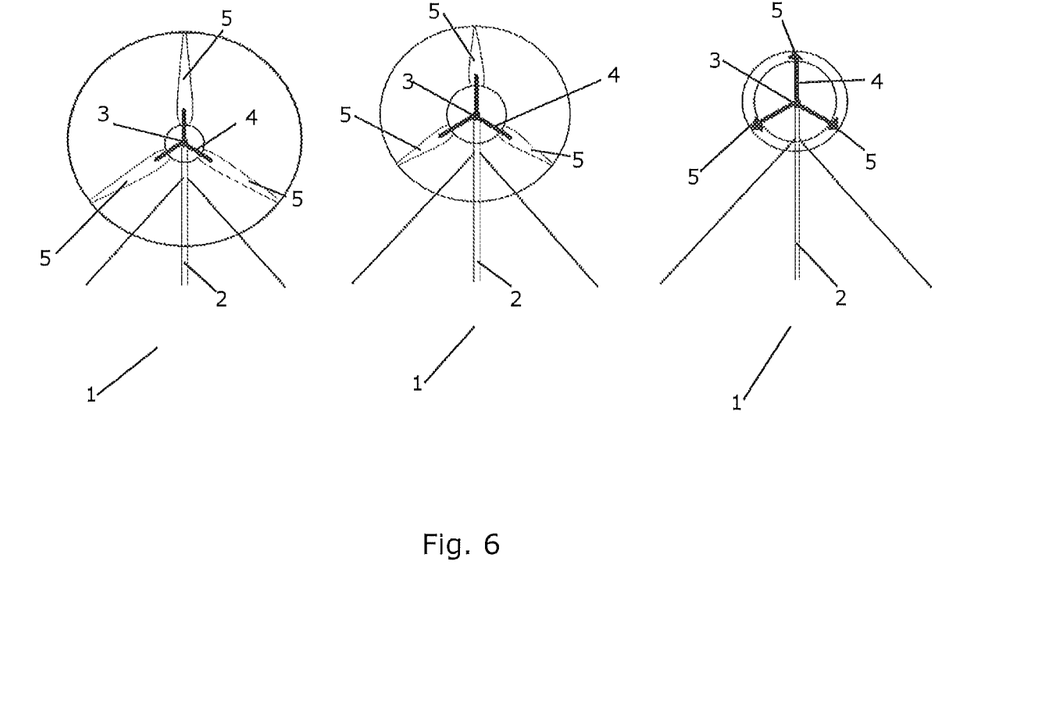
FIG. 6 illustrates a wind turbine according to an embodiment of the invention with the wind turbine blades in three different positions.

FIG. 6 illustrates a wind turbine 1 according to an embodiment of the invention with the wind turbine blades 5 arranged at three different pivot angles. The wind turbine 1 could, e.g., be the wind turbine of FIGS. 1-3.

The left most drawing shows the wind turbine 1 with the wind turbine blades 5 positioned at a minimum pivot angle, and thereby with a maximum rotor diameter and maximum tip height.

The middle drawing shows the wind turbine 1 with the wind turbine blades 5 positioned at a pivot angle which is larger than the pivot angle of the left most drawing. Accordingly, the rotor diameter of the wind turbine 1 of the middle drawing is smaller than the rotor diameter of the wind turbine 1 of the left most drawing. Thereby the tip height of the wind turbine 1 of the middle drawing is also lower than the tip height of the wind turbine 1 of the left most drawing.

The right most drawing shows the wind turbine 1 with the wind turbine blades 5 positioned at an even larger pivot angle, resulting in a very small rotor diameter, an even lower tip height and thereby an even lower risk of collision between an airborne object and the wind turbine 1. It can be seen that the wind turbine blades 5 are arranged substantially parallel to a rotational axis of the hub 3. This position is sometimes referred to as 'barrel mode'.

Figure 7:
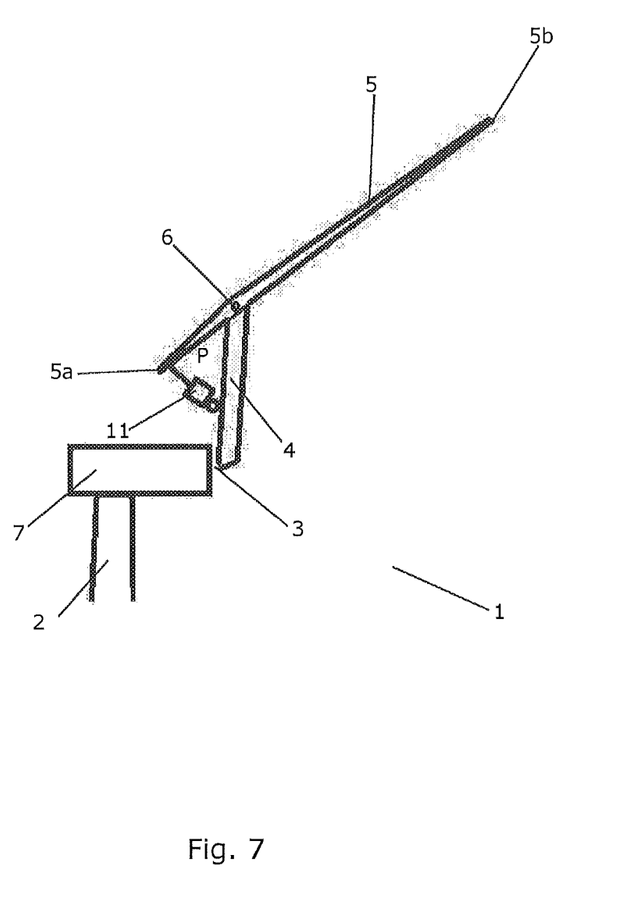
FIGS. 7-9 illustrate various mechanisms for adjusting a pivot angle of wind turbine blades of wind turbines according to embodiments of the invention.

FIG. 7 is a schematic view illustrating a wind turbine 1 according to a second embodiment of the invention. The wind turbine 1 of FIG. 7 is very similar to the wind turbine 1 of FIGS. 1-3, and it will therefore not be described in detail here.

The wind turbine 1 of FIG. 7 is not provided with the wires illustrated in FIGS. 1-3. Instead the wind turbine blades 5 are biased towards a position defining a minimum pivot angle, and thereby a maximum rotor diameter, by means of a hydraulic mechanism 11 connected between the blade carrying structure 4 and the wind turbine blade 5, at a position between the inner tip end 5a of the wind turbine blade 5 and the hinge 6. The hydraulic mechanism 11 applies a biasing force to the wind turbine blades 5 which pulls the wind turbine blades 5 towards the position defining a minimum pivot angle. The applied biasing force can be adjusted by adjusting a pressure of the hydraulic mechanism 11.

Figure 8:
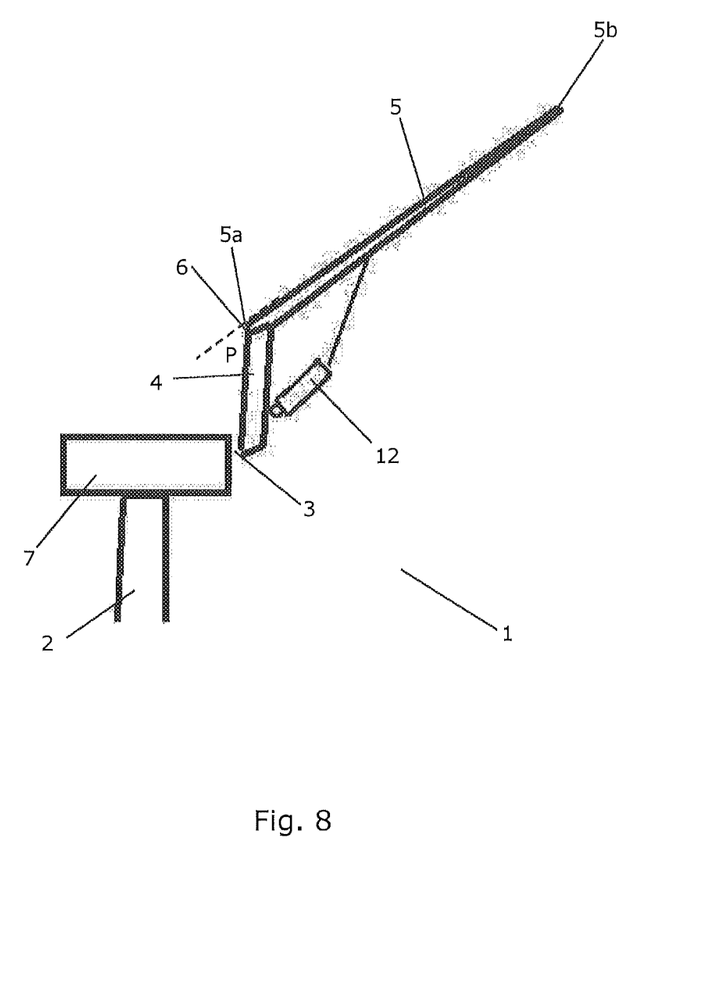

FIG. 8 is a schematic view illustrating a wind turbine 1 according to a third embodiment of the invention. The wind turbine 1 of FIG. 8 is very similar to the wind turbines 1 of FIGS. 1-3 and 7, and it will therefore not be described in detail here.

In the wind turbine 1 of FIG. 8 the wind turbine blades 5 are connected to the blade carrying structure 4 via a hinge 6 at the inner tip end 5a of the wind turbine blade 5. Furthermore, the wind turbine 1 of FIG. 8 is not provided with biasing means biasing the wind turbine blades 5 towards a position defining a minimum pivot angle, and thereby a maximum rotor diameter. Instead a hydraulic mechanism 12 is connected between the blade carrying structure 4 and the wind turbine blade 5, and the wind turbine blades 5 can be pulled towards a position defining maximum pivot angle, and thereby minimum rotor diameter by means of the hydraulic mechanism 12. Accordingly, the hydraulic mechanism 12 applies a force to the wind turbine blades 5 which causes them to move in this direction.

In the case that an adjustment of the pivot angle P of the wind turbine blades 5 is required, this can be obtained by adjusting the force applied to the wind turbine blades 5. In the wind turbine 1 of FIG. 8 this can be obtained by adjusting the pressure of the hydraulic mechanism 12.

Figure 9:
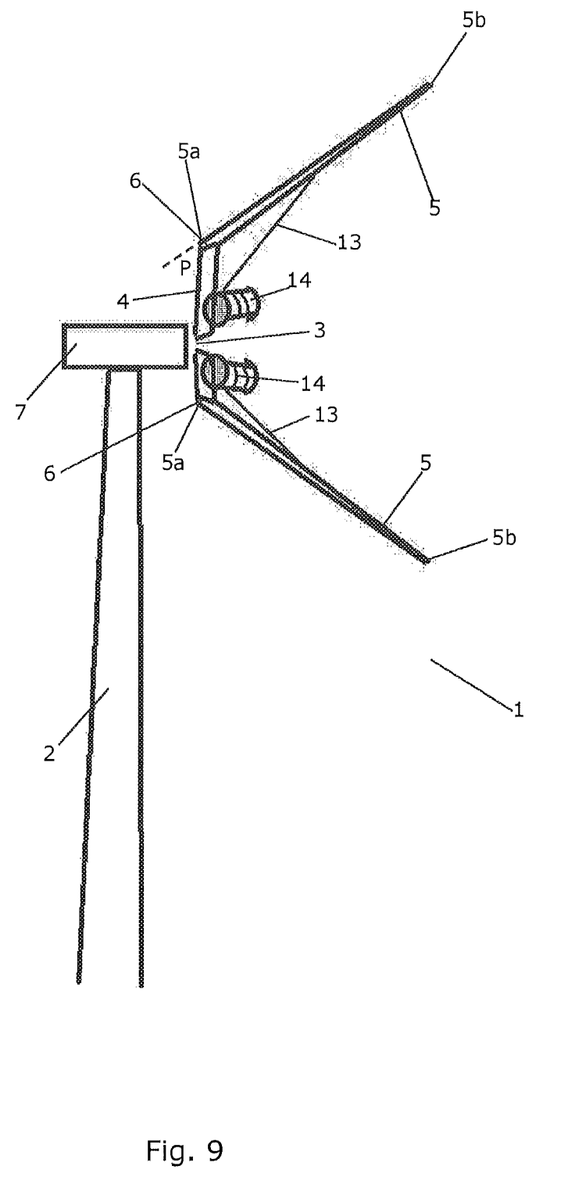

FIG. 9 is a schematic view illustrating a wind turbine 1 according to a fourth embodiment of the invention. The wind turbine 1 of FIG. 9 is very similar to the wind turbines of FIGS. 1-3, 7 and 8, and it will therefore not be described in detail here.

Similarly to the wind turbine 1 of FIG. 8, the wind turbine blades 5 of the wind turbine 1 of FIG. 9 are connected to the blade carrying structure 4 via a hinge 6 at the inner tip end 5a of the wind turbine blades 5. However, in the wind turbine 1 of FIG. 9 the force applied to the wind turbine blades 5 causing them to move towards a position defining maximum pivot angle, and thereby minimum rotor diameter, is provided by means of wires 13 connected to winches 14 mounted on the blade carrying structure 4. In the case that an adjustment of the pivot angle of the wind turbine blades is required, this can be obtained by operating the winches 14, thereby adjusting the length of the wires 13 and accordingly the applied pulling force.

The invention claimed is:

1. A method for operating a wind turbine, the wind turbine comprising:
a tower,
at least one nacelle mounted on the tower via a yaw system, and
a hub mounted rotatably on each of the at least one nacelle, each hub comprising:
a blade carrying structure, and
one or more wind turbine blades, each of the one or more wind turbine blades being connected to the blade carrying structure via a hinge at a hinge position of the wind turbine blade, each of the one or more wind turbine blades thereby being arranged to perform pivot movements relative to the blade carrying structure between a minimum pivot angle and a maximum pivot angle,
the method comprising steps of:
detecting an airborne object entering a predefined zone around the wind turbine,
comparing a current tip height of the wind turbine to a maximum tip height value, the maximum tip height value representing a maximum allowable tip height under currently prevailing conditions, and
in the case that the current tip height exceeds the maximum tip height value, adjusting the pivot angle of the one or more wind turbine blades in order to decrease the tip height of the wind turbine to a value below the maximum tip height value.

2. The method according to claim 1, further comprising a step of applying a biasing force to the one or more wind turbine blades which biases the one or more wind turbine blades towards a position defining a minimum pivot angle, and wherein the step of adjusting the pivot angle of the one or more wind turbine blades comprises reducing the biasing force applied to the one or more wind turbine blades.

3. The method according to claim 1, wherein the step of adjusting the pivot angle of the one or more wind turbine blades comprises applying a force to the one or more wind turbine blades which causes the one or more wind turbine blades to move towards a position which increases the pivot angle.

4. The method according to claim 1, wherein the step of adjusting the pivot angle of the one or more wind turbine blades comprises adjusting a rotational speed of the wind turbine and/or a generator torque of the wind turbine.

5. The method according to claim 1, further comprising a step of calculating the maximum tip height value based on a maximum allowable tip speed value.

6. The method according to claim 1, wherein the step of detecting an airborne object is performed by means of radar detection.

7. The method according to claim 1, wherein the step of adjusting the pivot angle of the one or more wind turbine blades in order to decrease the tip height of the wind turbine is based on a time condition.

8. The method according to claim 1, further comprising steps of:
detecting that the airborne object is no longer within the predefined zone around the wind turbine, and
adjusting the pivot angle of the one or more wind turbine blades in order to increase the tip height of the wind turbine.

9. The method according to claim 1, further comprising a step of generating a signal indicating the current tip height of the wind turbine.

10. A wind turbine, comprising:
a tower,
at least one nacelle mounted on the tower via a yaw system, and
a hub mounted rotatably on each of the at least one nacelle, each hub comprising:
a blade carrying structure, and
one or more wind turbine blades, each of the one or more wind turbine blades being connected to the blade carrying structure via a hinge at a hinge position of the wind turbine blade, each of the one or more wind turbine blades thereby being arranged to perform pivot movements relative to the blade carrying structure between a minimum pivot angle and a maximum pivot angle,
wherein the wind turbine further comprises one or more mechanisms arranged to adjust the pivot angle of the one or more wind turbine blades towards a position defining a maximum pivot angle to provide a tip height of the wind turbine below a maximum allowable tip height under currently prevailing conditions in response to a signal indicating that an airborne object entering a predefined zone around the wind turbine has been detected.

11. The wind turbine according to claim 10, further comprising a biasing mechanism arranged to apply a biasing force to the one or more wind turbine blades which biases the one or more wind turbine blades towards a position defining the minimum pivot angle, and wherein the mechanism arranged to adjust the pivot angle of the one or more wind turbine blades is arranged to reduce the applied biasing force.

12. The wind turbine according to claim 10, wherein the wind turbine is a downwind wind turbine.

* * * * *